US012139238B2

(12) United States Patent
Oekland et al.

(10) Patent No.: US 12,139,238 B2
(45) Date of Patent: Nov. 12, 2024

(54) LIFTING ELEMENT CONNECTION DEVICE

(71) Applicant: STAVENG TRANSFERA AS, Stavanger (NO)

(72) Inventors: Arvid Oekland, Bremnes (NO); Bjoern Moellerhaug, Valevag (NO)

(73) Assignee: STAVENG TRANSFERA AS, Stavanger (NO)

( * ) Notice: Subject to any disclaimer, the term of this patent is extended or adjusted under 35 U.S.C. 154(b) by 797 days.

(21) Appl. No.: 17/292,721

(22) PCT Filed: Nov. 5, 2019

(86) PCT No.: PCT/NO2019/050240
§ 371 (c)(1),
(2) Date: May 11, 2021

(87) PCT Pub. No.: WO2020/101501
PCT Pub. Date: May 22, 2020

(65) Prior Publication Data

US 2021/0394870 A1 Dec. 23, 2021

(30) Foreign Application Priority Data

Nov. 15, 2018 (NO) .................................... 20181461

(51) Int. Cl.
*B66C 1/66* (2006.01)
*B63B 27/10* (2006.01)
*B63B 27/30* (2006.01)
*B66C 1/12* (2006.01)

(52) U.S. Cl.
CPC .............. *B63B 27/30* (2013.01); *B63B 27/10* (2013.01); *B66C 1/663* (2013.01); *B66C 1/125* (2013.01)

(58) Field of Classification Search
CPC ......... B63B 27/30; B63B 27/10; B66C 1/125; B66C 1/127; B66C 1/101; B66C 1/663
USPC ................................ 294/67.33, 82.24, 82.35
See application file for complete search history.

(56) References Cited

U.S. PATENT DOCUMENTS 3,445,133 A * 5/1969 Reischl ..................... B66C 1/66 294/90
3,666,216 A * 5/1972 Nagy ........................ B63G 8/42 244/172.4
4,026,594 A 5/1977 Kumpulainen
4,130,313 A * 12/1978 Clifford .................... B66C 1/38 294/82.32

(Continued)

FOREIGN PATENT DOCUMENTS

GB 2 403 706 A 1/2005
NO 324597 B1 11/2007

(Continued)

*Primary Examiner* — Paul T Chin
(74) *Attorney, Agent, or Firm* — Norman B. Thot

(57) ABSTRACT

A lifting element connection device for connecting a lifting element suspended from a cable to a sling element. The lifting element connection device includes a top surface having at least one angled portion which guides the lifting element towards a receiving area, and a lifting element receiving portion which holds the sling element, receives the lifting element from the receiving area, and provides a connection between the lifting element and the sling element when the lifting element is positioned in the lifting element receiving portion.

14 Claims, 5 Drawing Sheets

(56) References Cited

U.S. PATENT DOCUMENTS

| | | | | |
|---|---|---|---|---|
| 4,416,480 | A * | 11/1983 | Moody ..................... | B66C 1/34 294/82.3 |
| 4,518,186 | A * | 5/1985 | Hornberg .................. | B66C 1/66 294/82.24 |
| 4,609,219 | A * | 9/1986 | Go ............................ | B66C 1/66 294/906 |
| 6,422,625 | B1 * | 7/2002 | Van Der Laan .......... | B66C 1/34 294/82.11 |
| 7,648,183 | B2 * | 1/2010 | Cornwell .................. | B66C 1/62 294/90 |
| 9,950,905 | B2 * | 4/2018 | Parkinson ................. | B66C 1/36 |
| 2004/0032140 | A1 * | 2/2004 | Solstad ................... | B66C 13/08 294/81.4 |
| 2005/0161962 | A1 * | 7/2005 | Topper ...................... | B66C 1/10 294/215 |
| 2015/0336775 | A1 * | 11/2015 | Ruivenkamp ............. | B66C 1/66 414/139.6 |

FOREIGN PATENT DOCUMENTS

| | | | |
|---|---|---|---|
| WO | WO 2014/166945 | A1 | 10/2014 |
| WO | WO 2014/168487 | A1 | 10/2014 |
| WO | WO 2017/109445 | A1 | 6/2017 |

* cited by examiner

LIFTING ELEMENT CONNECTION DEVICE

CROSS REFERENCE TO PRIOR APPLICATIONS

This application is a U.S. National Phase application under 35 U.S.C. § 371 of International Application No. PCT/NO2019/050240, filed on Nov. 5, 2019 and which claims benefit to Norwegian Patent Application No. NO 20181461, filed on Nov. 15, 2018. The International Application was published in English on May 22, 2020 as WO 2020/101501 A1 under PCT Article 21(2).

FIELD

The present invention relates to a lifting element connection device, and more specifically to a lifting element connection device for connecting a lifting element to a sling element.

BACKGROUND

Lifting containers and other heavy units from one floating vessel to another or between a vessel and a fixed platform is a well known operation offshore, as is lifting between a floating vessel to an onshore location. Containers and bulky loads of different size and weight are commonly lifted from the deck of, for example, a supply vessel and onto, for example, a platform, a dock or another vessel. Such a loading or unloading operation presently requires a crew on the deck where the load is lifted to or from. A lifting element such as a hook is connected to a cable, which is controlled by a crane. The crew connects the lifting element to a lifting sling assembly connected to a container. The lifting sling assembly may be connected in one lifting point such as a master link, and the lifting element is manually connected, for example, to the master link.

A lifting operation involving at least one floating vessel constitutes a great risk for the crew, as the containers and units to be lifted are heavy and may move suddenly and unpredictably due to a vessel's movement at sea. There may be significant motion, for example, between a vessel such as a ship and an offshore facility. Heave compensation systems in a crane may compensate for some of the motion, but when the load is swaying, and especially if the deck is slippery, the load may cause harm to the surroundings immediately after it is lifted above the deck. Such lifting operations are associated with a high risk for the crew, and is a known cause of injuries.

There is therefore a need for new technology and solutions to reduce or eliminate the above mentioned disadvantages of known techniques.

Documents useful for understanding the field of technology include WO 2014/166945 A1, which describes a device for lifting a load, such as an intermodal container, comprising a lifting unit adapted for coupling to a crane wire and a sling having first and second ends.

SUMMARY

An aspect of the present invention is to reduce or to eliminate the above mentioned disadvantages of known techniques or to provide further advantages over the state of the art.

In an embodiment, the present invention provides a lifting element connection device for connecting a lifting element suspended from a cable to a sling element. The lifting element connection device includes a top surface comprising at least one angled portion which is configured to guide the lifting element towards a receiving area, and a lifting element receiving portion which is configured to hold the sling element, to receive the lifting element from the receiving area, and to provide a connection between the lifting element and the sling element when the lifting element is positioned in the lifting element receiving portion.

The appended claims and the detailed description below outline further embodiments.

BRIEF DESCRIPTION OF THE DRAWINGS

The above and other characteristics will become clear from the following description of embodiments, given as non-restrictive examples, with reference to the attached schematic drawings in which.

DETAILED DESCRIPTION

Figure 1:
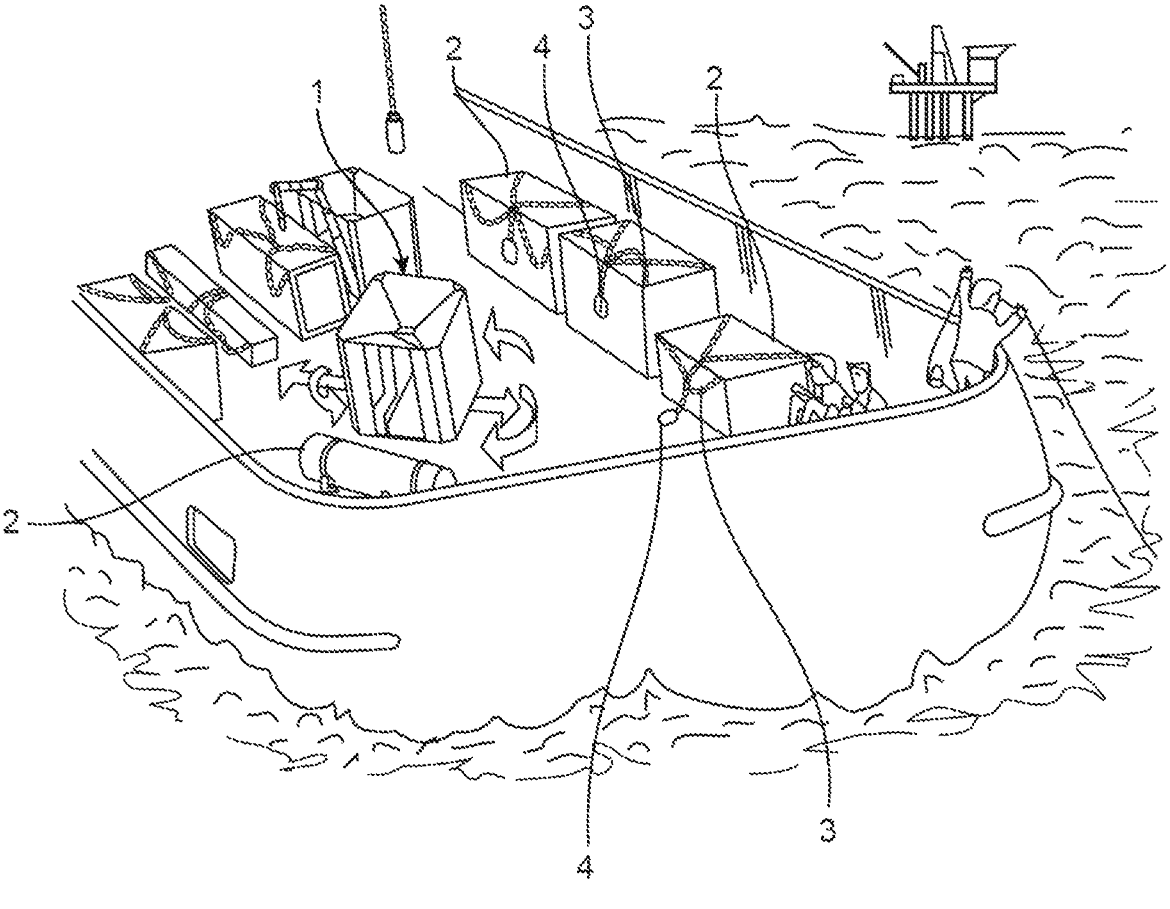
FIG. 1 is an illustration of a lifting element connection device on the deck of a vessel.

In an embodiment, the present invention provides a lifting element connection device for connecting a lifting element suspended from a cable to a sling element, the lifting element connection device comprising: a top surface having at least one angled portion for guiding the lifting element towards a receiving area; a lifting element receiving portion configured for holding the sling element; wherein the lifting element receiving portion is further configured for receiving the lifting element from the receiving area and providing a connection between the lifting element and the sling element when the lifting element is positioned in the lifting element receiving portion.

The following description may use terms such as "horizontal", "vertical", "back and forth", "up and down", "upper", "lower", "inner", "outer", "forward", "rear", etc. These terms generally refer to the views and orientations as shown in the drawings and that are associated with a normal use of the present invention. The terms are used for the reader's convenience only and shall not be limiting.

FIG. 1 shows a first embodiment of a lifting element connection device 1 on the deck of a vessel. The lifting element connection device 1 may comprise motive elements (which are not visible in FIG. 1; described in detail below) so that the lifting element connection device 1 is freely movable on the deck, i.e., is able to move in several directions, as is indicated by arrows in FIG. 1. The lifting element connection device 1 may thus, for example, be able to rotate about it's own axis, move forward and backward, sideways, etc. so that it can be positioned next to a load 2 to be lifted. The lifting element connection device 1 may be remotely controlled and positioned, or it may be manually positioned by a crew member next to the load 2.

A load 2 to be lifted is connected to a sling assembly 3, as is known in the art. The sling assembly 3 may be connected to the load 2, such as a container or other bulky load, at four corners. The sling assembly 3 may comprise one or more sling elements 4. A sling element 4 is as such a lifting point on a sling assembly 3. The sling element 4 is commonly known as a master link.

Figure 2:
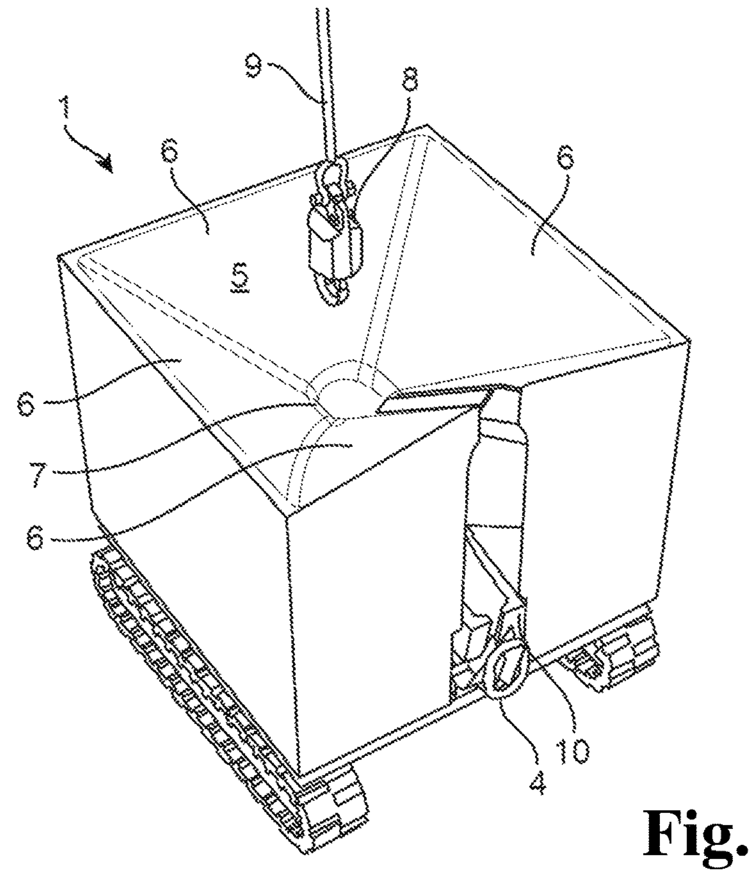
FIG. 2 is a perspective view of an embodiment of the lifting element connection device, with a lifting element connected to a cable approaching the device.

FIG. 2 illustrates an embodiment of the lifting element connection device 1. The lifting element connection device 1 comprises a top surface 5. In the illustrated embodiment, the top surface 5 comprises four angled portions 6. Each angled portion 6 extends from each respective side of the lifting element connection device 1 towards a receiving area 7. In the illustrated embodiment, the receiving area 7 is positioned approximately in the middle of the top surface 5, but it could also be positioned anywhere on the top surface 5. The top surface 5 may alternatively be funnel shaped and slant towards the receiving area 7, or the top surface 5 may comprise only one curved or bent angled portion 6 (e.g., circular-shaped) that slants towards a receiving area 7.

The receiving area 7 is in the illustrated embodiment an opening in the top surface 5, so that a lifting element 8 can pass through the receiving area 7 and further below the top surface 5 and possibly also into the interior of the lifting element connection device 1. The lifting element 8 is a hook in the illustrated embodiment, but it may also be a magnet, a claw, or any other means suitable as a lifting element. The top surface 5 thus acts as a guiding means for the lifting element connection device 1 so that the lifting element 8 suspended in a cable 9 is easy to navigate towards the lifting element connection device 1 and into the receiving area 7. It is as such easier to aim a lifting element 8 towards the receiving area 7 of a lifting element connection device 1 with a large top surface 5 than a lifting element connection device 1 with a small top surface 5. The lifting element 8 does not need to be precisely aimed at the receiving area 7; as long as the lifting element 8 contacts the top surface 5, the lifting element 8 is steered/guided towards the receiving area 7 by the at least one angled portion 6 of the top surface 5.

As the lifting element 8 is guided through the receiving area 7, the lifting element 8 may be further guided by a channel (not visible in FIG. 2; described in further detail below) that may connect the receiving area 7 to a lifting element receiving portion 10. The top surface 5, the receiving area 7 and/or the lifting element receiving portion 10 may be shaped so as to orientate the lifting element 8 in a certain direction in the lifting element receiving portion 10. The receiving area 7 can, for example, have a particular shape, which upon receiving the lifting element 8 would force it to be orientated in a predetermined direction in order to enter the lifting element receiving portion 10. The shape and weight distribution of the lifting element 8 and the shape of the top surface 5 can be designed so as to turn and guide the lifting element 8 when it moves towards the receiving area 7. The lifting element receiving portion 10 may also have a particular shape or configuration so that the lifting element 8 is only accommodated if it is oriented in a particular way. This is described further with reference to FIGS. 4 and 5. The lifting element receiving portion 10 may be arranged on a side of the lifting element connection device 1, as illustrated in FIGS. 2-5, so as to be accessible from an outside of the lifting element connection device 1, for example, by an operator on the deck.

A sling element 4 may be connected to the lifting element connection device 1. The sling element 4 may be a master link of a lifting sling assembly, as described with reference to FIG. 1, or it could be any other means to which a lifting element 8 may be connected. For better clarity, the rest of the lifting sling assembly is not visible in FIGS. 2-5. The sling element 4 may, in one way of using the lifting element connection device 1, be positioned on the lifting element connection device 1 by a crew member after the lifting element connection device 1 has been positioned next to a load 2, and before the lifting operation commences.

Figure 3:
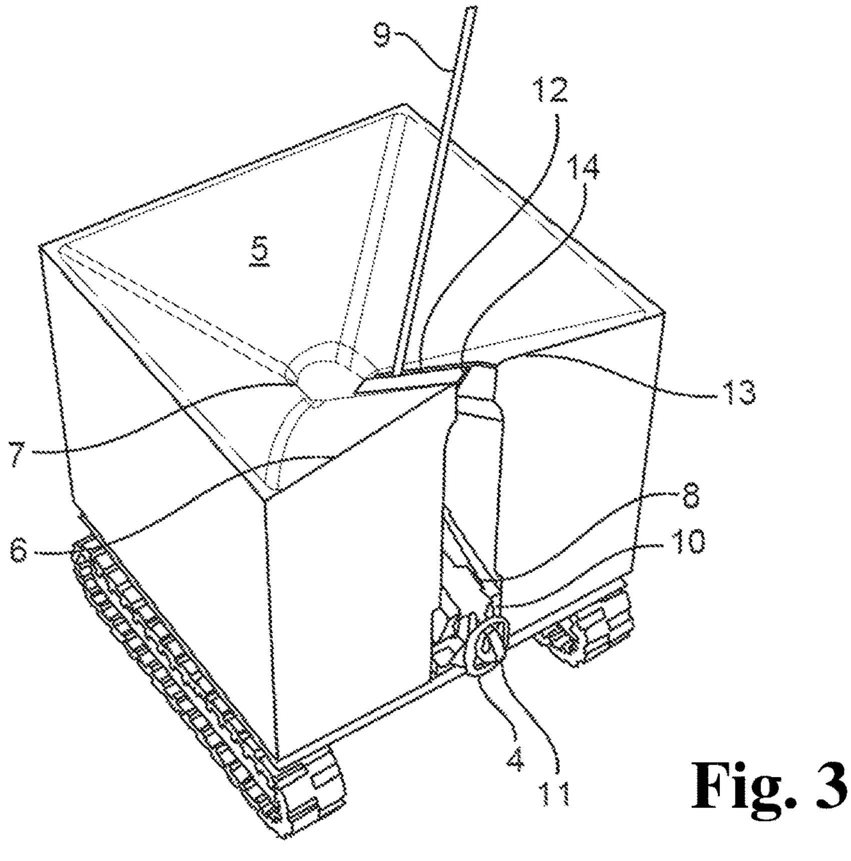
FIG. 3 is a perspective view of the lifting element connection device at the initiation of a lift.

Referring now to FIG. 3, the sling element 4 is positioned so that when the lifting element 8 is positioned in the lifting element receiving portion 10, a contact portion 11 of the lifting element 8 is positioned near the sling element 4, and the contact portion 11 can be securely connected to the sling element 4. The contact portion 11 of the illustrated embodiment is a hook. This is described more in detail with reference to FIGS. 4 and 5.

The top surface 5 comprises a groove 12. The groove 12 extends from the receiving area 7 to a periphery 13 of the top surface 5. The periphery 13 is defined as the outer edge of the top surface 5. In the illustrated embodiment, the groove 12 extends in a straight line, but it may also be curved or have other shapes. The groove 12 may be positioned on the angled portion 6 as in the illustrated embodiment, or it may be elsewhere on a top surface 5. The illustrated embodiment also shows that the groove 12 is positioned directly above the lifting element receiving portion 10 and is orientated parallel with the lifting element receiving portion 10, however, the groove 12 may also be positioned and orientated elsewhere on the top surface 5.

As the cable 9 is tensed in order to initiate a lift, the cable 9 is guided from the receiving area 7 through the groove 12 and out through the periphery 13 of the top surface 5. In FIG. 3, the cable 9 is illustrated approximately halfway between receiving area 7 and the periphery 13. The lifting element 8 connected to the sling element 4 is thus free to be further lifted up. The lifting element receiving portion 10 may be positioned partly outside the lifting element connection device 1, and in particular outside the periphery 13 of the top surface 5. As the cable 9 is tensed from a point above, the resistance in the cable 9 due to the weight of the lifting element 8, to which it is fastened, will thus force the cable 9 into the groove 12. As the cable 9 is tensed further, the lifting element 8 rotates upwards in the lifting element receiving portion 10 until it is in an approximately upright position. The lifting element 8 is thereby suspended from the cable 9, outside the lifting element connection device 1, and ready to be lifted. This sequence is also described further with reference to FIG. 6.

The groove 12 may comprise a cover element 14. In the illustrated embodiment, the cover element 14 is provided as two longitudinal flaps connected on either side of the groove 12. The longitudinal flaps are rotatable upwards from an initial covering position so that a lifting element 8 approaching from above will not get stuck in the groove 12. The cover element 14 may also be one or more flexible elements covering the groove 12, and the cover element 14 may be mechanically movable in other ways to uncover the groove 12.

Figure 4:
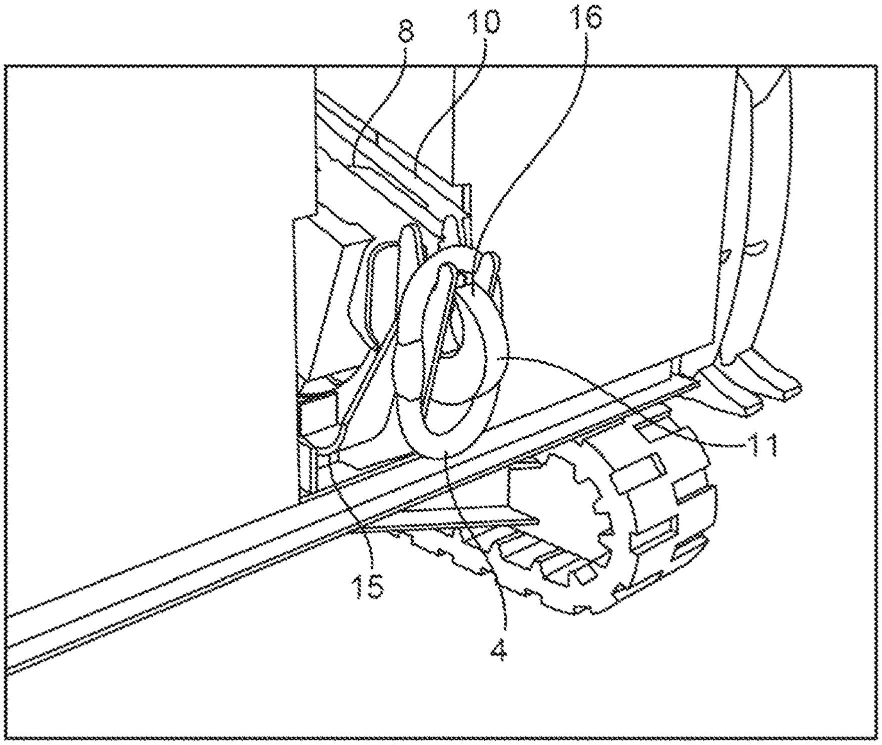
FIG. 4 is a detail view of the lifting element positioned in a lifting element receiving portion of the lifting element connection device.

FIG. 4 is a detail view of the lifting element receiving portion 10 of the lifting element connection device 1, and illustrates the lifting element 8 in the lifting element receiving portion 10. The lifting element connection device 1 comprises a sling element support 15, and FIG. 4 shows a sling element 4 resting on the sling element support 15. The sling element 4 may be positioned on the sling element support 15, for example, by a crew member, as described with reference to FIG. 2. The sling element support 15 may protrude upwards, and is configured for supporting a sling element 4 so that the contact portion 11 of the lifting element 8 is adjacent the sling element 4 when the lifting element 8 is resting in the lifting element receiving portion 10. In the illustrated embodiment, the contact portion 11 which is provided as a hook extends through the sling element 4 when the lifting element 8 is resting in the lifting element receiving portion 10.

As the lifting element 8 passes through the receiving area and is guided towards the lifting element receiving portion 10, it is oriented in a certain direction, as was previously described. The orientation of the lifting element 8 may be such that the point 16 of the contact portion 11 of the hook is pointing upwards when the lifting element 8 is resting in the lifting element receiving portion 10. The lifting element 8 is thereby ready to engage with the sling element 4.

Figure 5:
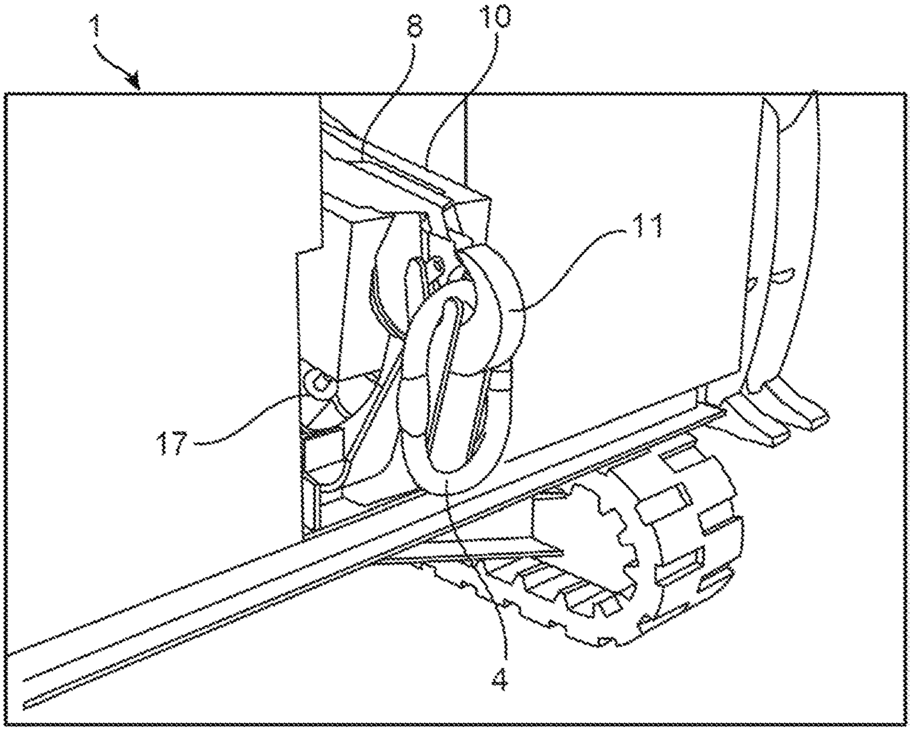
FIG. 5 is a detail view of the lifting element positioned in a lifting element receiving portion of the lifting element connection device and connected to a sling element.

FIG. 5 illustrates that the lifting element receiving portion 10 is elevated by elevating device 17 so that the contact portion 11 of the lifting element 8 is engaged with the sling element 4. A locking mechanism (not shown in the drawings) may also be triggered so that the sling element 4 is releasably locked to the lifting element 8.

The elevating device 17 may be a hydraulic piston, an electromotor driving a shaft, a spring mechanism, or any other device for elevating the lifting element receiving portion 10. The lifting element receiving portion 10 may be rotated about an axis within the lifting element connection device 1 so that the contact portion 11 is elevated sufficiently to engage with the sling element 4, or the lifting element receiving portion 10 may be elevated in a translator movement.

The elevating device 17 may alternatively elevate the lifting element 8 itself out of the receiving portion 10, the receiving portion 10 being stationary, so that the lifting element 8 engages with the sling element 4. The elevating device 17 may as such be any element or mechanism that upon activation operates on the receiving portion 10 or on the lifting element 8, and moves the lifting element 8 towards an engagement position with the sling element 4.

The elevating device 17 may be remotely controlled. There may therefore not be a need for crew to manually connect the sling element 4 to the lifting element 8.

Figure 6:
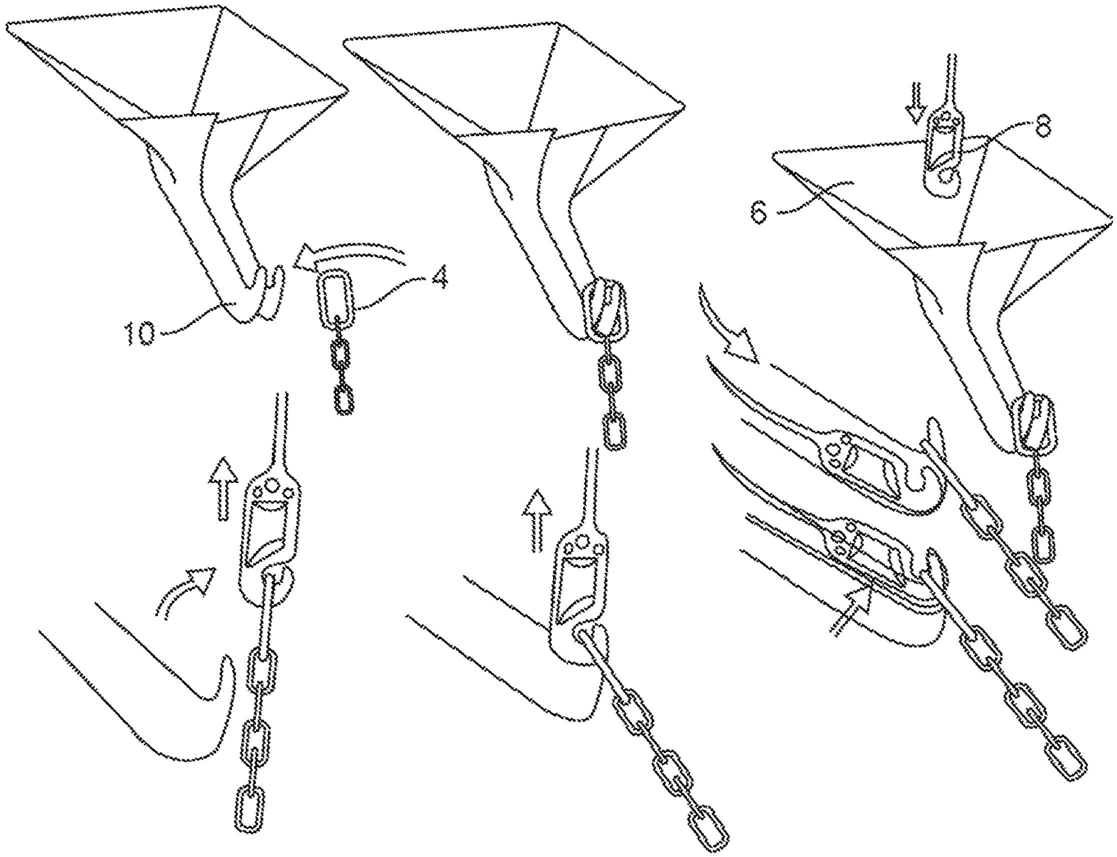
FIG. 6 is a step-by-step illustration of how a lifting element on a cable is connected to a sling element in the lifting element connection device.

FIG. 6 is a step-by-step illustration of how a lifting element 8 on a cable is connected to a sling element in the lifting element connection device 1. Starting from the top left, considering the subfigures in a clockwise direction, the sling element 4 is positioned on the receiving portion 10 (top left), a lifting element 8 is received in the angled portion 6 (top right), the lifting element 8 is elevated by an elevating device 17 and connected to the sling element 4 (bottom right), the wire is tensioned upwards (bottom center), and the lifting element 8 is lifted out of the receiving portion 10 with the sling element 4.

Figure 7:
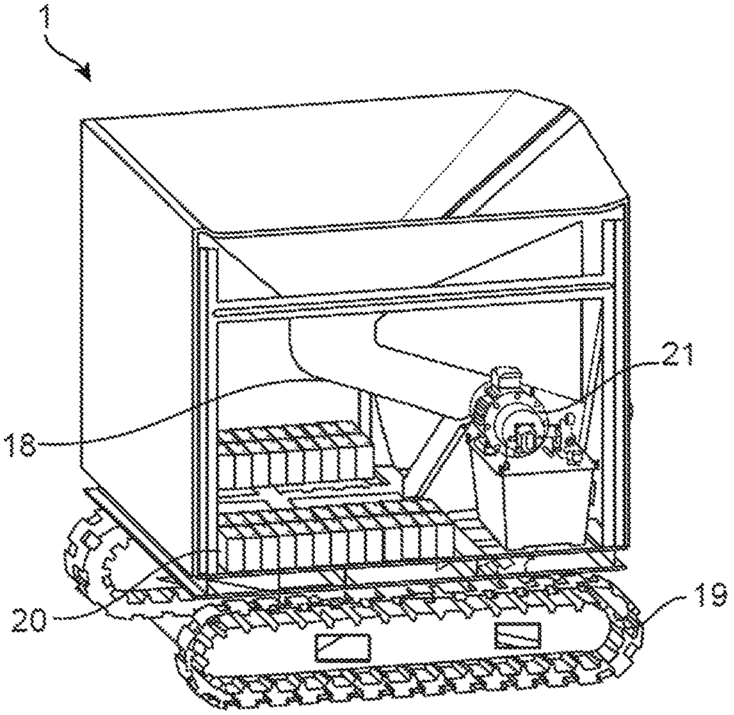
FIG. 7 is a section cut through an embodiment of the lifting element connection device.

FIG. 7 is a sectional cut through the lifting element connection device 1, illustrating parts of the interior. The lifting element connection device 1 may comprise a lifting element channel 18 connecting the receiving area to the lifting element receiving portion 10 (which is not visible in the drawing). As explained previously, the lifting element channel 18 may be shaped so as to accommodate the lifting element 8 and to provide for a predetermined orientation of the lifting element 8. In an embodiment without a lifting element channel 18, the lifting element 8 may be guided directly from the receiving area 7 into the lifting element receiving portion 10.

The lifting element connection device 1 may comprise motive elements 19. In the illustrated embodiment, the motive elements 19 are belts, but the lifting element connection device 1 may also be equipped with wheels or other motive configurations. The motive elements 19 may also be adapted for transporting the lifting element connection device 1 on tracks and rails, and the motive elements 19 may even be a low frictional surface that allows for sliding of the lifting element connection device 1 on the ground, and that can optionally be securely fixed to the ground. The motive elements 19 may allow the lifting element connection device 1 to move in any horizontal direction for easy maneuvering of the lifting element connection device 1, and the motive elements 19 may also allow the lifting element connection device 1 to rotate horizontally about a center axis.

In the illustrated embodiment, the motive elements 19 are powered by a power source 20 such as a battery pack, and controlled by a control mechanism 21 such as an electric motor.

Figure 8:
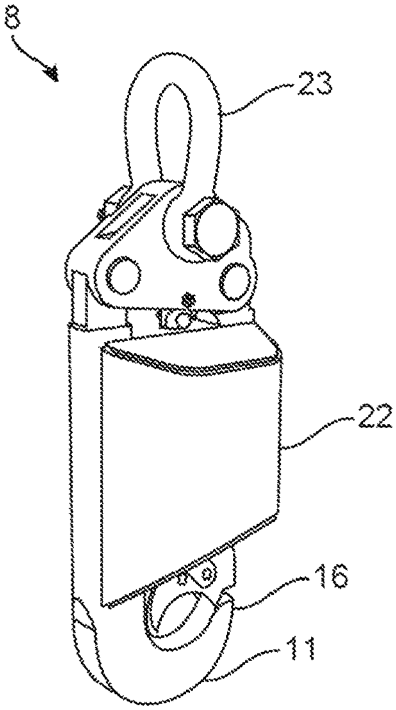
FIG. 8 is a perspective view of a hook element with a hook block.
Figure 9:
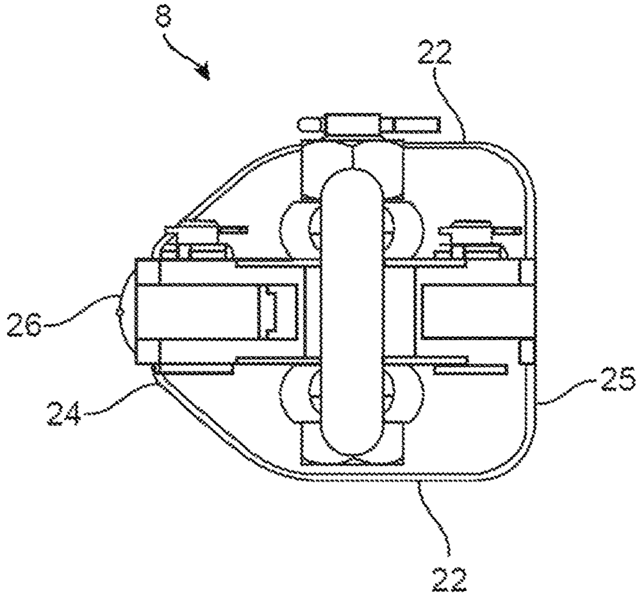
FIG. 9 is a top view of a hook element with a hook block.

FIGS. 8 and 9 show a lifting element 8 that may be utilized together with a lifting element connection device 1 of the present invention. FIG. 8 is a perspective view of the lifting element 8, and FIG. 9 is a top view. The lifting element 8 is here a hook comprising a contact portion 11 and may comprise a lifting element body 22. The lifting element body 22 may be a hook block, and may be positioned between the contact portion 11 and a cable interaction element 23.

The lifting element body 22 may comprise an acute side 24 and a blunt side 25. In FIG. 9, the blunt side 25 is the right hand side, and the acute side 24 is the left hand side. The acute side 24 may have a ridge 26 extending in the longitudinal direction of the lifting element body 22. The lifting element channel 18 and/or the lifting element receiving portion 10 may have a shape corresponding to the shape of the acute side 24 so that the lifting element 8 is oriented and accommodated correctly in the lifting element receiving portion 10, as described with reference to FIG. 2.

The acute side 24 may also be heavier than the blunt side 25 so that the acute side 24 is further drawn towards a lower position than the blunt side 25. The lifting element 8 will therefore inherently strive to position, for example, the point 16 in an upwards direction, as the point 16 is pointing towards the blunt (light) side 25 of the lifting element 8. If the lifting element 8 is a claw, a magnet or other lifting element, these devices might have other criteria for positioning.

Figure 10:
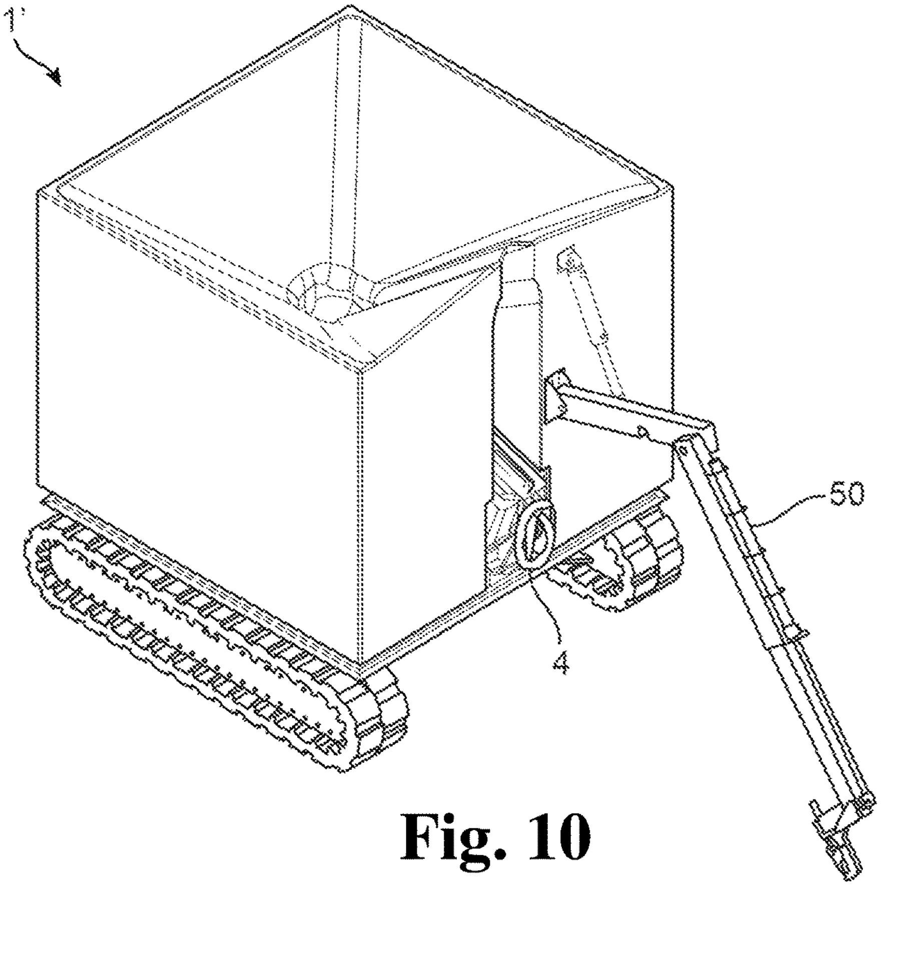
FIG. 10 is a perspective view of a lifting element connection device with a robot arm according to a second embodiment of the present invention.

FIG. 10 illustrates a second embodiment of a lifting element connection device 1'. In this embodiment, the lifting element connection device 1' comprises a robotic arm 50. The robotic arm 50 may be remotely controlled, and may have a grabber element (or the like) which can be used for engaging (e.g., picking up) and connecting a sling element 4 to the lifting element receiving portion 10 of the lifting element connection device 1'. The lifting element connection device 1' may otherwise comprise any combination of, or all of, the features described above in relation to the lifting element connection device 1.

According to embodiments of the present invention, lifting containers and other heavy units from one floating vessel to another or between a vessel and a fixed platform can be carried out in a safer and/or more efficient manner. This may provide benefits in terms of operational safety, reduced downtime during operations, an increased operating window (e.g., weather window) for carrying out such lifting operations, etc. A system such as that described in embodiments herein may be particularly well-suited for use with unmanned platforms, whereby the lifting element connection device 1, 1' can be positioned on the deck of the unmanned platform and remotely controlled to assist in lifting operations. Further applications include use on land which may also realize some or all of the above-mentioned advantages.

While the present invention has been described with reference to the embodiments mentioned above, it is to be understood that modifications and variations can be made thereto without departing from the scope of the present invention, and that such modifications and variations shall remain within the field and scope of the present invention. Reference should also be had to the appended claims.

LIST OF REFERENCE NUMERALS

1, 1' Lifting element connecting device
2 Load (to be lifted)
3 Sling assembly
4 Sling element
5 Top surface
6 Angled portion
7 Receiving area
8 Lifting element
9 Cable
10 Lifting element receiving portion
11 Contact portion
12 Groove
13 Periphery
14 Cover element
15 Sling element support
16 Point
17 Elevating device
18 Lifting element channel
19 Motive element
20 Power source
21 Control mechanism
22 Lifting element body
23 Cable interaction element
24 Acute side
25 Blunt side
26 Ridge
50 Robotic arm

What is claimed is:

1. A lifting element connection device for connecting a lifting element suspended from a cable to a sling element, the lifting element connection device comprising:

a top surface comprising at least one angled portion which is configured to guide the lifting element towards a receiving area of the lifting element connection device, and a groove which is arranged to extend from the receiving area to a periphery of the top surface, the groove being configured to allow the cable to move through at least a portion of the top surface; and a lifting element receiving portion which is configured to hold the sling element, to receive the lifting element from the receiving area, and to provide a connection between the lifting element and the sling element when the lifting element is positioned in the lifting element receiving portion.

2. The lifting element connection device as recited in claim 1, wherein the top surface is provided as a funnel shaped surface.

3. The lifting element connection device as recited in claim 1, further comprising:

a lifting element channel which is configured to connect the receiving area to the lifting element receiving portion.

4. The lifting element connection device as recited in claim 1, where the groove comprises a cover element.

5. The lifting element connection device as recited in claim 4, wherein the cover element is configured to move in an upwards direction from an initial covering position.

6. The lifting element connection device as recited in claim 4, wherein the cover element is flexible.

7. The lifting element connection device as recited in claim 1, wherein the groove is positioned vertically above the lifting element receiving portion.

8. The lifting element connection device as recited in claim 1, further comprising a motive element which is configured to move the lifting element connection device.

9. The lifting element connection device as recited in claim 8, wherein the motive element is power controlled.

10. The lifting element connection device as recited in claim 8, wherein the motive element is configured to be remotely controlled.

11. The lifting element connection device as recited in claim 1, wherein the lifting element is a hook element which comprises a hook.

12. The lifting element connection device as recited in claim 1, further comprising:

an elevating device which is configured to move the lifting element when the lifting element is positioned in the lifting element receiving portion.

13. The lifting element connection device as recited in claim 12, wherein at least a part of the lifting element receiving portion is moveable in an upwards direction via the elevating device for elevating the lifting element so as to facilitate a connection between the lifting element and the sling element.

14. The lifting element connection device as recited in claim 1, wherein the lifting element comprises a lifting element body which comprises an acute side and a blunt side, the acute side and the blunt side being configured to provide a predetermined positioning of the lifting element in the lifting element receiving portion.

* * * * *